A. RITTENHOUSE.
Lamp Stove.

No. 109,054. Patented Nov. 8, 1870.

Witnesses: Frank Stant, Harry W. Gamble

Inventor: Alvah R[ittenhouse]

United States Patent Office.

ALVAH RITTENHOUSE, OF PHILADELPHIA, PENNSYLVANIA.

Letters Patent No. 109,054, dated November 8, 1870.

IMPROVEMENT IN LAMP HEATING-APPARATUS.

The Schedule referred to in these Letters Patent and making part of the same.

I, ALVAH RITTENHOUSE, of the city and county of Philadelphia and State of Pennsylvania, have invented a new and useful "Device for Heating Food, Medicinal Preparations, &c."

The object of my invention is to provide a device for nurseries, hospitals, sick-rooms, &c., in order to prepare and keep warm any preparation of food, drinks, medicinal preparations, stimulants, cloths, lotions, decoctions, or for warming or softening plasters, &c.

My invention consists of one or more metallic pots formed with concave bottoms, the said pots being provided with openings, in which are inserted tubes, passing up through the pots in a conical form for the passage of the heat from the lamp in order to warm such substances or liquids as may be placed in the pots; also, for the purpose of warming cloths or plasters without interfering with the contents of the pots.

The lamp used (which is any ordinary coal-oil or other style in which illuminating oils are burned) is provided with a low glass chimney, and will give sufficient light in order that the attendant may see to manipulate the article to be administered to the patient.

Figure 6:
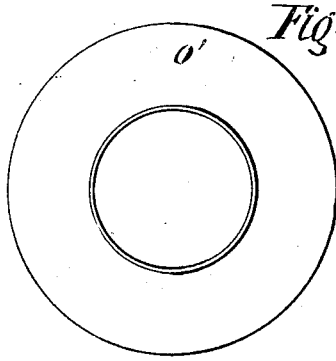
Figure 4:
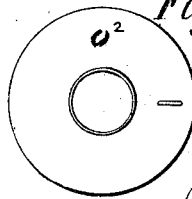
Figure 5:
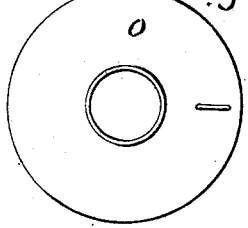

Figures 4, 5, and 6 are detached views of the covers or rings used.

P is a metallic pot, formed somewhat in the shape of an ordinary tea-pot. The bottom $b$ of said pot is made concave and provided with circular openings, as shown in fig. 3, in which are inserted tubes $t\ t^1\ t^2$, which pass up through the center of the pot and incline toward a common center, where they are retained firmly in place by means of a band, C, as shown in fig. 2.

Figure 2:
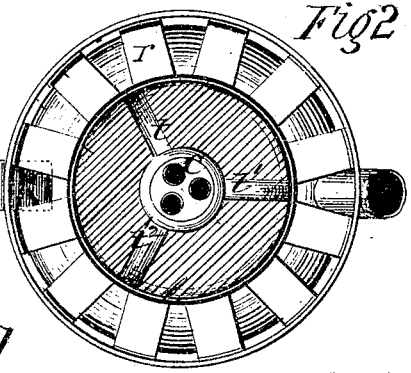
Figure 2 is a top view of the lower pot, with upper pot and cover removed, in order to show the interior of the same, (the arrangement of the tubes are the same in both pots.)
Figure 3:
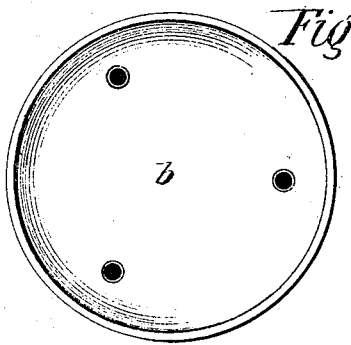
Figure 3 is a view showing the concave form of the bottom of the pots, and the arrangement of the tubes for heating the interior of same.

The upper part of the pot P is provided with a circular rim, $r$, and ledge $l$, as shown in fig. 2. On said ledge is placed a cover or ring, $o$, fig. 5, which is provided with an opening in the center in order to allow the upper part of the band C to pass through and the cover to inclose the opening of the top of the pot and surround the band.

Figure 1:
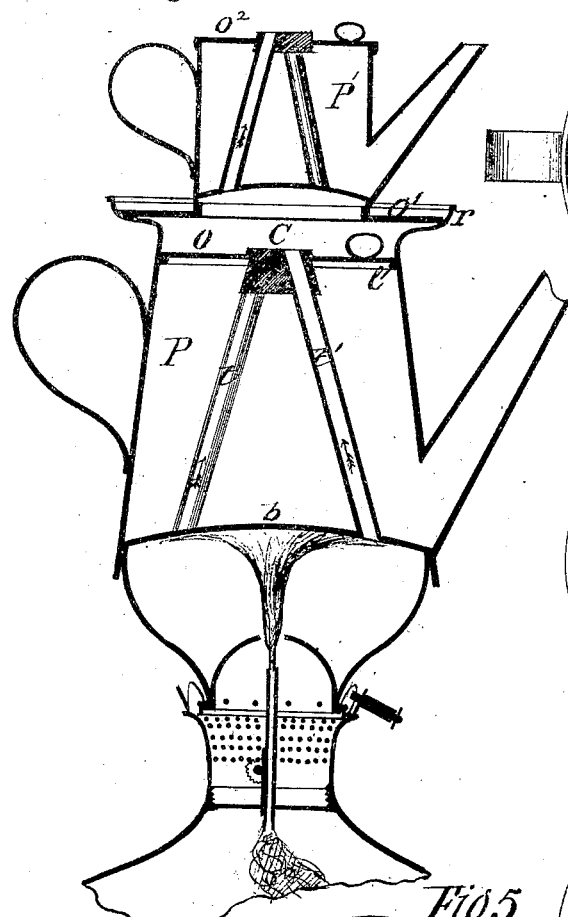
Figure 1 is a vertical section of my invention, showing the same applied to an ordinary coal-oil lamp with a low glass chimney.

Fitting in and resting on the rim $r$ is a cover or ring, $O^1$, figs. 1 and 6, on which sets the pot P', which is of the same construction as pot P.

With the exception of the rim $r$, the pot P' is inclosed by means of the cover or ring $O^2$, fig. 4.

It will be seen from the above description that when the pot P is set on the chimney of the lamp that the flame strikes the concave bottom $b$; the flame and heat will ascend up through the tube $t\ t^1\ t^2$, thus heating the contents of the pot P. The heat then passes out through the upper ends of the tubes, surrounded by the band C. The heat is sufficient at this point to warm plasters, poultices, &c., or by placing on the ring or cover $O^1$, which fits in and rests on the rim $r$, the pot P' can be set and its contents heated by the caloric passing through the tubes, which are constructed in the same manner as the tubes in pot P.

If desired, the ring or cover $O^1$, fig. 6, can be placed immediately on the chimney of the lamp and the pot P' set thereon.

What I claim, and desire to secure by Letters Patent, is—

The construction of the pots P or P', provided with tubes $t\ t^1\ t^2$, concave bottom $b$, band C, covers or rings $O\ O^1\ O^2$, so as to operate substantially as and for the purpose specified.

In witness whereof, I have hereunto signed my name in the presence of two subscribing witnesses.

ALVAH RITTENHOUSE.

Witnesses:
 FRANK STOUT,
 HARRY W. GAMBLE.